United States Patent
Bareis

(10) Patent No.: US 8,794,093 B2
(45) Date of Patent: Aug. 5, 2014

(54) DEVICE FOR PRESSING ON A RACK

(75) Inventor: Helmut Bareis, Eschach (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 13/590,570

(22) Filed: Aug. 21, 2012

(65) Prior Publication Data
US 2013/0068048 A1 Mar. 21, 2013

Related U.S. Application Data

(63) Continuation of application No. PCT/EP2011/050725, filed on Jan. 20, 2011.

(30) Foreign Application Priority Data

Feb. 22, 2010 (DE) .......................... 10 2010 002 193

(51) Int. Cl.
*B62D 3/12* (2006.01)
*F16H 55/28* (2006.01)
*F16H 19/02* (2006.01)

(52) U.S. Cl.
CPC ............... *F16H 19/02* (2013.01); *B62D 3/123* (2013.01); *F16H 55/283* (2013.01)
USPC ............................. 74/388 PS; 74/409; 74/440

(58) Field of Classification Search
USPC ................. 74/388 PS, 409, 440, 422; 384/42
See application file for complete search history.

(56) References Cited

U.S. PATENT DOCUMENTS

| 3,384,141 | A | * | 5/1968 | Kost ............................... 411/304 |
| 5,845,532 | A | * | 12/1998 | Phillips ........................... 74/422 |
| 6,178,843 | B1 | | 1/2001 | Machida et al. |
| 7,487,984 | B1 | * | 2/2009 | Lemont et al. ........... 280/93.514 |
| 7,823,695 | B2 | | 11/2010 | Rosendahl et al. |
| 7,930,951 | B2 | * | 4/2011 | Eickholt ................... 74/388 PS |
| 8,511,191 | B2 | * | 8/2013 | Kawakubo et al. ............. 74/409 |
| 2002/0124670 | A1 | | 9/2002 | Bugosh |
| 2006/0157487 | A1 | | 7/2006 | Rosendahl et al. |
| 2007/0209463 | A1 | | 9/2007 | Song et al. |

FOREIGN PATENT DOCUMENTS

| DE | 10 2006 010 018 | 9/2007 |
| DE | 10 2006 043 578 | 3/2008 |
| EP | 1 147 992 | 10/2001 |
| EP | 1 681 494 | 7/2006 |
| EP | 1 832 497 | 9/2007 |

* cited by examiner

*Primary Examiner* — William C Joyce
(74) *Attorney, Agent, or Firm* — Jordan and Hamburg LLP

(57) ABSTRACT

A device for pressing a rack onto a pinion engaging the rack, more particularly for a steering system of a motor vehicle, comprises a pressure piece which is slidably guided in a housing and which is loaded in the direction of the rack, and an adjusting device. Devices made of metal are known from the prior art, which, however, generate excessive noise emissions during operation. Therefore, the pressure piece is made of plastic and the adjusting device is made of metal and/or plastic.

11 Claims, 5 Drawing Sheets

DEVICE FOR PRESSING ON A RACK

BACKGROUND OF THE INVENTION

The invention relates to a device for pressing a rack onto a pinion engaging in the rack, more particularly for a steering system of a motor vehicle, comprising a pressure piece, which is slidably guided in a housing and can be loaded in the direction of the rack, and an adjusting device.

The devices of the type in question known from the prior art have previously been made of metal. In higher-value vehicles in particular, the devices still have intolerable excessive noise emission during operation.

SUMMARY OF THE INVENTION

The object of the invention is, therefore, to improve a device of the initially stated type in such a way that the noise emission occurring during operation is reduced in the future.

The invention archives the stated object by way of a device of the type in question, in which, according to the invention, the pressure piece can be made of plastic and the adjusting device can be made of metal and/or plastic. Since plastic naturally has better damping behavior than metal, noise emission during operation is reduced. Particularly good results in terms of reduced noise emission and adequate strength are achieved when the pressure piece and the adjusting device are made of a polyamide 66 having fiber-glass reinforcement. In principle, however, other plastics having comparable properties can be used for the pressure piece. In addition to reducing noise emission, the invention also saves weight and costs.

The pressure piece can be equipped in the interior thereof with ribs, which are oriented in the direction of the center of the pressure piece. The pressure piece can therefore have the same wall and rib thicknesses, thereby ensuring that contraction is minimized and that shrinkage cavities and sink marks are prevented. In a preferred embodiment, the pressure piece can comprise, in the interior thereof, a bearing face matched to the contour of a spring washer. In this manner, optimal placement of the spring washer at the pressure piece is ensured.

In a development of the invention, a sliding element, which can be produced together with the pressure piece as a multiple-component injection molded part, can be disposed between the pressure piece and the rack. By manufacturing the pressure piece and the sliding element as a multiple-component injection molded part, the assembly effort that was previously required to install a sliding film between the pressure piece and the rack is markedly reduced.

The shape of the sliding element can be matched to the contour of the rack. The sliding element has a U-shaped cross section. Good results are attained with the sliding element in practical application when it has a thickness of approximately 1 millimeter. Since the sliding element should have the lowest possible coefficient of friction, it can be advantageously made of a material containing PTFE, wherein the material is preferably plastic. Basically, other materials having good antifrictional properties may also be used, however.

In a preferred embodiment, at least one damping element, which can also be produced together with the pressure piece as a multiple-component injection molded part, can be disposed between the pressure piece and the housing. Manufacturing the pressure piece and the damping element as a multiple-component injection molded part greatly simplifies assembly in this case as well. The damping element can preferably be designed as an O-ring.

The adjusting device can comprise two disks, which can be made of metal and/or plastic, in order to reduce play occurring between the rack and pinion. Contact surfaces at which the two disks bear against one another can comprise at least two slanting surface segments. As a result, the surface pressure between the two disks is lower, thereby minimizing the creep thereof and, simultaneously, the creep of the other components made of plastic can also be compensated for by way of the disks, which are rotatable relative to one another.

It is particularly advantageous when an adjusting screw is also made of plastic, preferably of fiberglass reinforced polyamide 66.

A sealing element can be disposed at the adjusting screw to ensure that the interior of the device is reliably protected against contamination. The adjusting screw and the sealing element can also be produced as a multiple-component injection molded part in order to simplify assembly in this case as well.

Advantageously, the at least one damping element and the sealing element can be made of silicone, although other substances known to a person skilled in the art can also be used for these purposes.

As an alternative to manufacturing the aforementioned components as multiple-component injection molded parts, they can also be connected to one another by way of cross-linking when suitable plastics are used. Furthermore, bonding and welding, more particularly ultrasonic welding, are possible.

An exemplary embodiment of the invention is explained in greater detail in the following with reference to the attached drawings.

DESCRIPTION OF THE PREFERRED EMBODIMENTS

Figure 1:
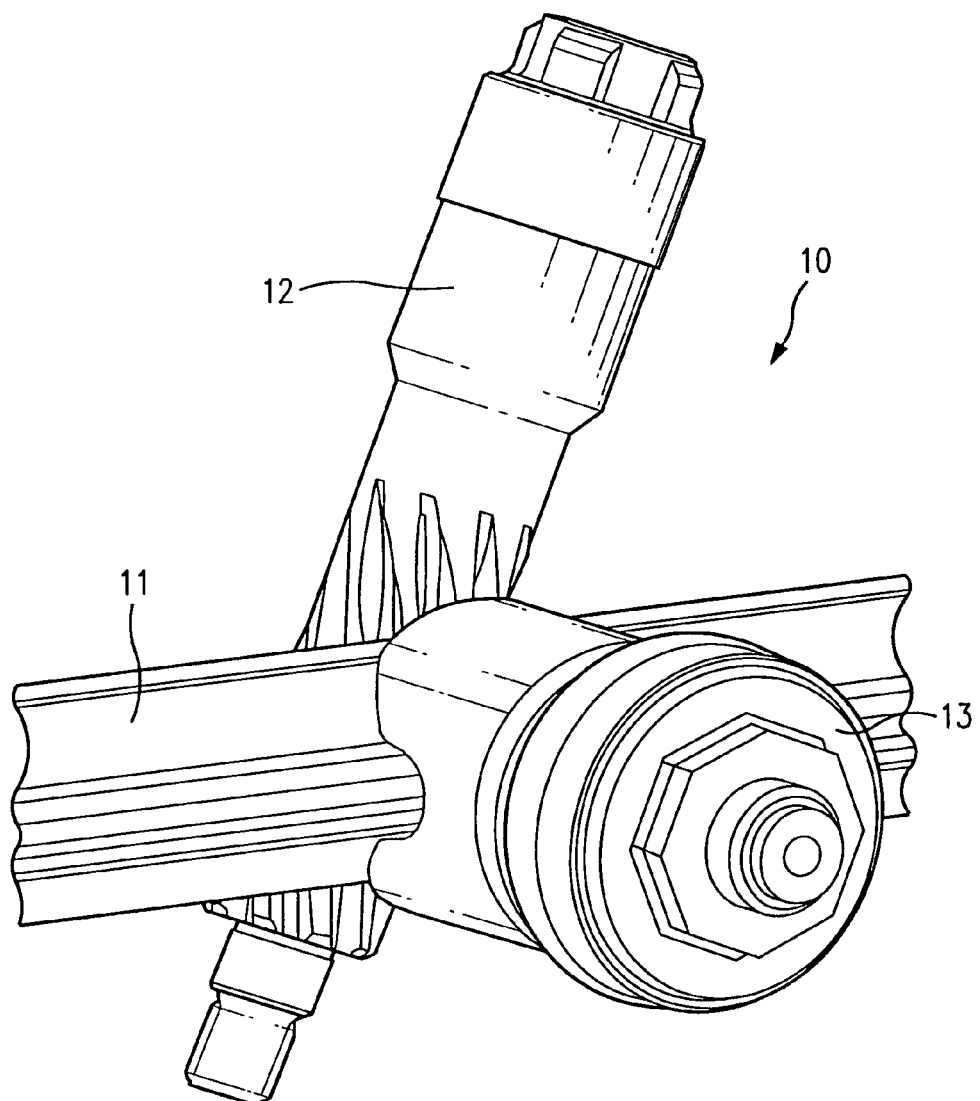
FIG. 1 shows a steering system in the region of the pinion.

FIG. 1 shows a steering system 10 of a motor vehicle that is not depicted here in greater detail. The steering system 10 comprises a rack 11, and a pinion 12. A device 13 presses the rack 11 against the engaged pinion 12.

Figure 2:
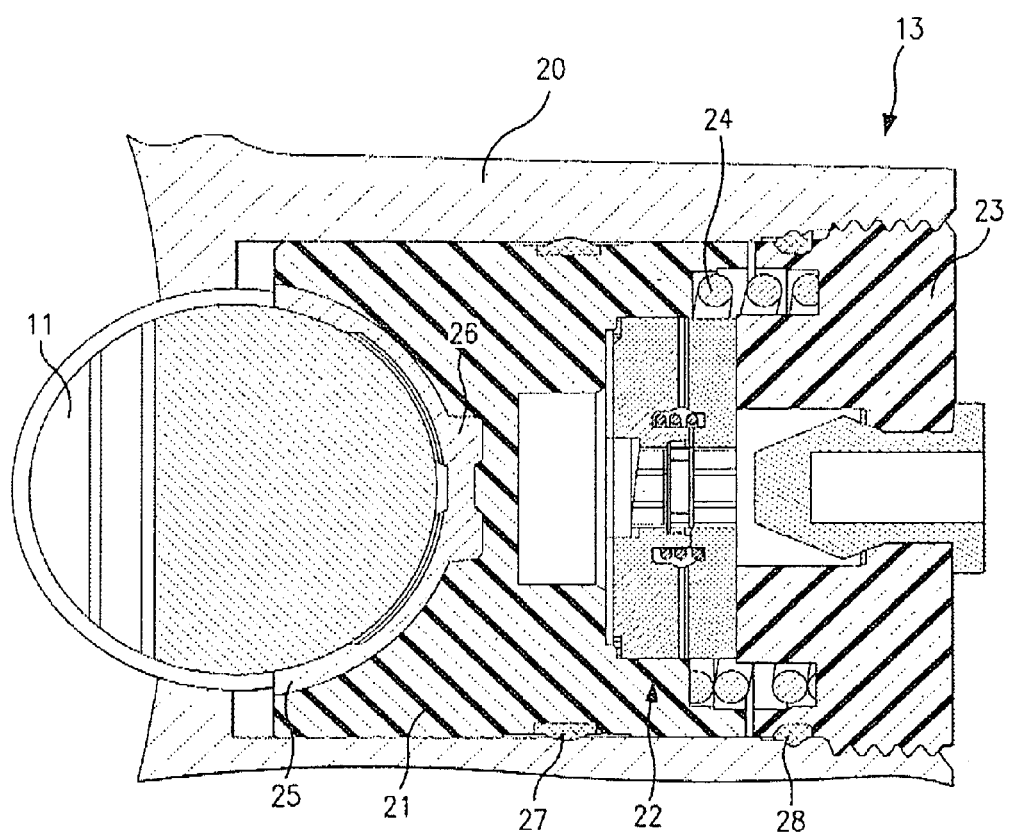
FIG. 2 shows a sectional view through a device according to the invention.

A pressure piece 21 made of plastic is slidably guided in a housing 20 (see FIG. 2). An adjusting device 22 is disposed adjacent to the pressure piece 21.

A compression spring 24, which presses the pressure piece 21 against the rack 11, is disposed between an adjusting screw 23, which is also made of plastic, and the pressure piece 21.

Figure 3:
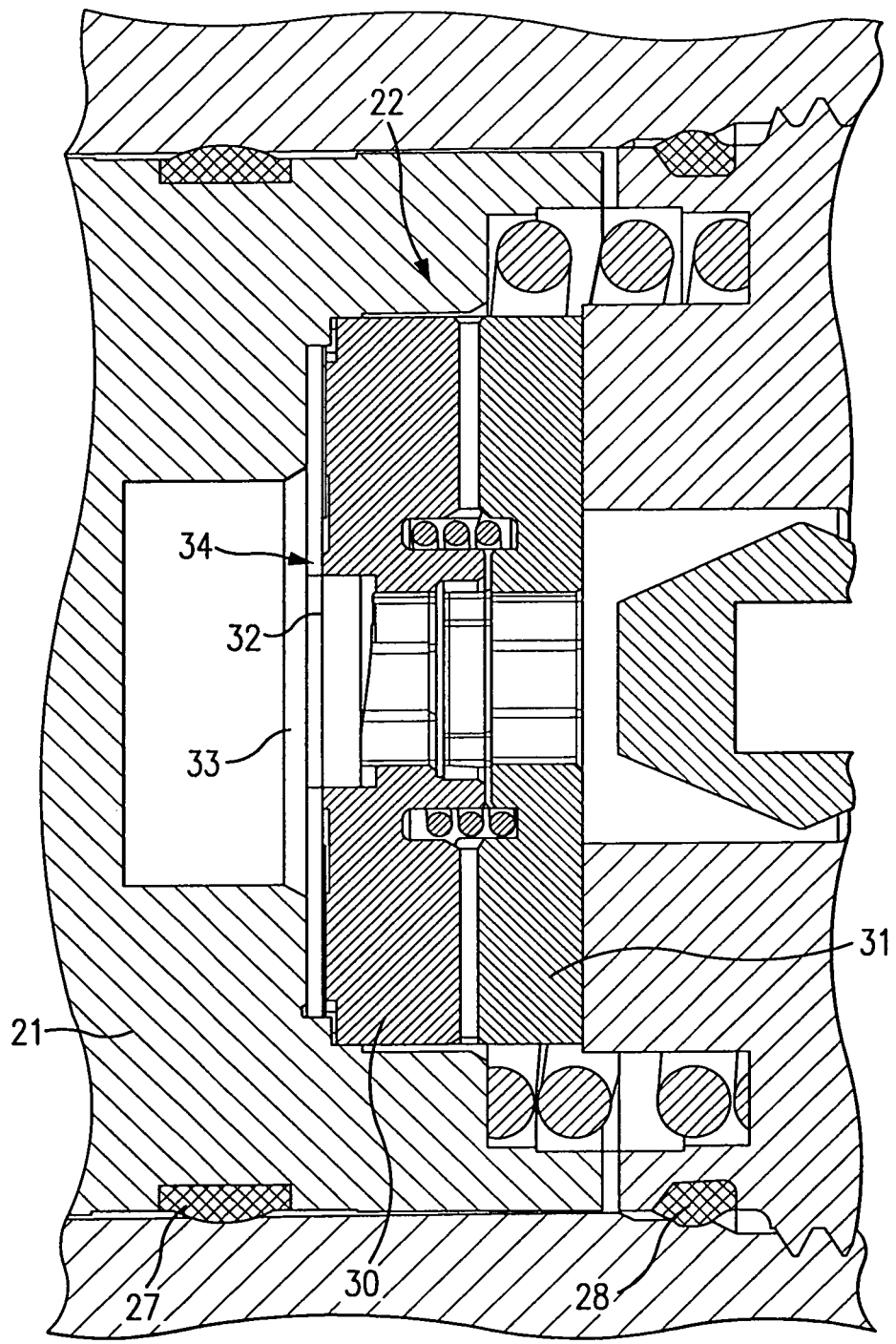
FIG. 3 shows an enlarged detailed view from FIG. 2.

A spring washer 32 is disposed between the adjusting device 22, which comprises two disks 30 and 31 made of plastic or metal, and the pressure piece 21. A recess 33 is provided in the pressure piece 21 in the region of the spring washer 32 (see FIG. 3).

The disk 30 comprises a circumferential shoulder 34, which bears against the spring washer 32. The height of the shoulder 34 corresponds at least to play that corresponds, for example, to irregularities on the toothing between the rack and pinion 11 and 12, the out-of-roundness, nonconformities of parallelism, other tolerance-related deviations thereof, and to the creep of the pressure piece 21 made of plastic and the disks 30 and 31, which are also made of plastic. The play can be 0.1 millimeter, for example.

If the aforementioned deviations must be compensated for, the pressure piece 21 is pressed against the adjusting device 22 and therefore against the disk 30, and so the spring washer 32 is simultaneously pressed against the shoulder 34, whereby the spring washer 32 is displaced into the recess 33.

A sliding element 25 made of plastic is provided between the pressure piece 21 and the rack 11. It is made of a plastic having a low coefficient of friction and containing PTFE, for example. The cross section thereof is U-shaped and is therefore matched to the contour of the rack 11. The sliding element 25 comprises a shoulder 26, which engages in a corresponding recess provided in the pressure piece 21. The sliding element 25 is therefore reliably mounted on the pressure piece 21.

Furthermore, a circumferential damping element 27, which is preferably made of silicone, is disposed between the pressure piece 21 and the housing 20.

The pressure piece 21, the sliding element 25 and the damping element 27 can be produced as a multiple-component injection molded part, thereby greatly simplifying assembly.

A sealing element 28, which is also preferably made of silicone, is attached to the adjusting screw 23. The adjusting screw 23 and the sealing element 28 can also be produced as a multiple-component injection molded part.

Figure 4:
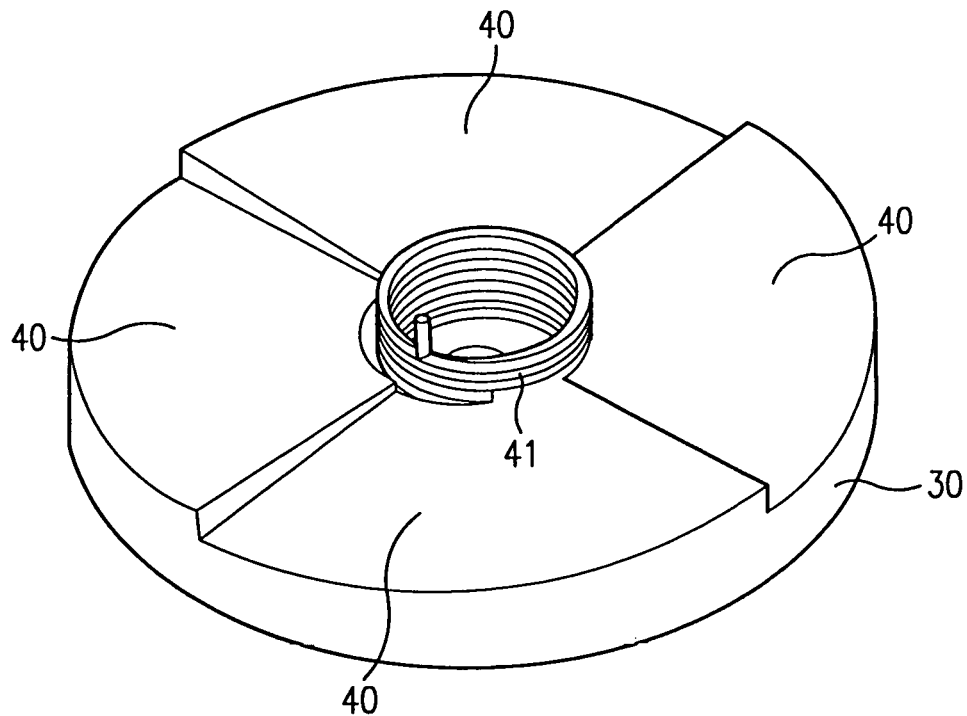
FIG. 4 shows a perspective view of a disk.
Figure 5:
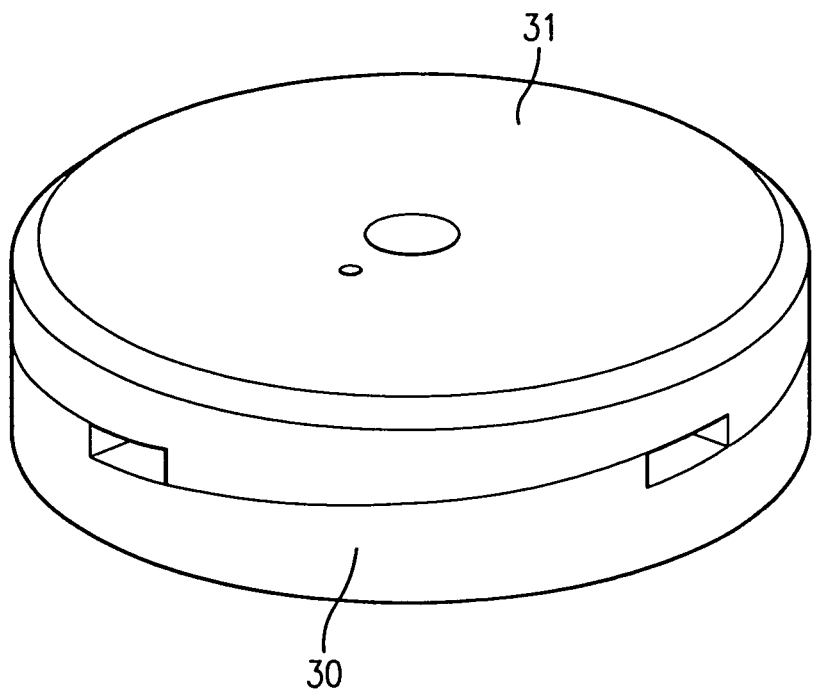
FIG. 5 shows a perspective view of two disks bearing against one another.
Figure 6:
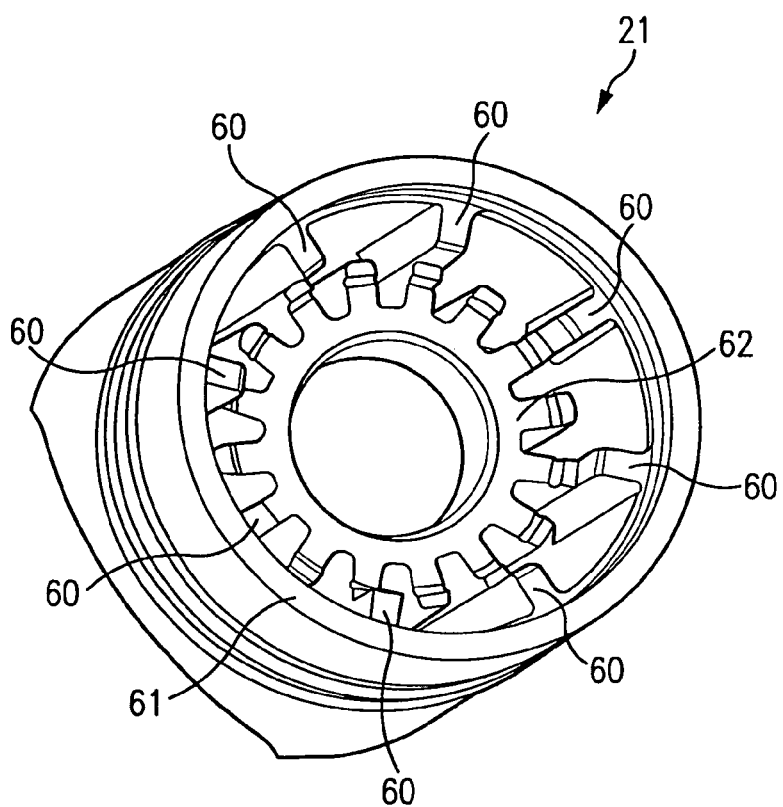
FIG. 6 shows a perspective view of the pressure piece.

FIGS. 4 and 5 show the adjusting disks 30 and 31 of the adjusting device 22. The disks 30 and 31 are equipped with contact surfaces having slanting surface segments (40). The adjusting disks 30 and 31 are rotatable relative to one another by way of a torsion spring 41, thereby allowing the overall thickness of the disks 30 and 31 to be increased in order to compensate for the aforementioned deviations. The slant of the surface segments 40 is as slight as possible. As a result, rotation of the disks 30 and 31 opposite the rotational direction of the torsion spring 41 is prevented. In addition, the slanting surface segments 40 enlarge the contact surface between the two adjusting disks 30 and 31, thereby minimizing the surface pressure between the two adjusting disks 30 and 31. The pressure piece 21 is equipped with ribs 60 in the interior thereof. The ribs 60 are oriented in the direction of the center of the pressure piece 21. To the extent possible, the thicknesses of the ribs 60 and a wall 61 are the same, in order to minimize the contraction of the ribs 60 and the wall 61 and to prevent shrinkage cavities and sink marks. A contact surface 62 matched to the contour of the spring washer 32 is located in the interior of the pressure piece 21.

LIST OF REFERENCE CHARACTERS 10 steering system
11 rack
12 pinion
13 device
20 housing
21 pressure piece
22 adjusting device
23 adjusting screw
24 compression spring
25 sliding element
26 shoulder
27 damping element
28 sealing element
30 adjusting disks
31 adjusting disk
32 spring washer
33 recess
34 shoulder
40 surface segment
41 torsion spring
60 rib
61 wall
62 bearing face

The invention claimed is:

1. A device for pressing a rack onto a pinion engaging the rack of a steering system of a motor vehicle, comprising:
    a pressure piece, which is slidably guided in a housing and which is loaded in a direction of the rack, the pressure piece being made of plastic;
    an adjusting device comprising an adjusting screw made of plastic and two disks which are made of metal or plastic, the two disks bearing against one another at contact surfaces, the contact surfaces having at least two slanting surface segments, the disks being rotatable relative to one another by way of a torsion spring, wherein one disk has a shoulder which lies against a spring washer; and
    a sliding element which is manufactured together with the pressure piece as a multiple component injection molded part and which is disposed between the pressure piece and the rack, wherein the shape of the sliding element is matched to the contour of the rack; and
    wherein an interior of the pressure piece is quipped with ribs oriented in a direction of a center of the pressure piece.

2. The device according to claim 1, wherein the pressure piece comprises, in the interior thereof, a bearing face matched to a contour of a spring washer.

3. The device according to claim 1, wherein at least one damping element which is manufactured together with the pressure piece as a multiple-component injection molded part, is disposed between the pressure piece and a housing.

4. The device according to claim 1, wherein the adjusting screw and a sealing element disposed thereon is produced as a multiple-component injection molded part.

5. The device according to claim 4, wherein at least one damping element and the sealing element are made of silicone.

6. The device according to claim 1, wherein the sliding element is made of a material containing PTFE.

7. The device according to claim 1, wherein the spring washer is disposed between said one disk having the shoulder and said pressure piece, a portion of the spring washer abutting the shoulder:
    wherein the pressure piece has a recess in a region of the spring washer; and
    wherein the shoulder, spring washer and recess are configured so that the portion of the spring washer abutting the shoulder is displaced at least in part into the recess.

8. The device according to claim 7, wherein the shoulder has a height configured to correspond to irregularities, within tolerance ranges, on toothing that occurs between the rack and pinion.

9. The device according to claim 7, wherein the pressure piece comprises, in the interior thereof, a bearing face matched to a contour of a spring washer.

10. A device for pressing a rack onto a pinion engaging the rack of a steering system of a motor vehicle, comprising:
    a pressure piece, which is slidably guided in a housing and which is loaded in a direction of the rack, the pressure piece being made of plastic;
    an adjusting device comprising two disks which are made of metal or plastic and which bear against one another at contact surfaces, the contact surfaces having at least two slanting surface segments, the disks being rotatable relative to one another by way of a torsion spring; and a sliding element which is manufactured together with the pressure piece as a multiple-component injection molded part and which is disposed between the pressure piece and the rack, wherein the shape of the sliding element is matched to the contour of the rack; and wherein an interior of the pressure piece is equipped with ribs oriented in a direction of a center of the pressure piece.

11. The device according to claim 10, wherein the pressure piece comprises, in the interior thereof, a hearing face matched to a contour of a spring washer.

\* \* \* \* \*